United States Patent [19]
Ona et al.

[11] Patent Number: 4,889,770
[45] Date of Patent: Dec. 26, 1989

[54] COMPOSITION FOR THE SURFACE TREATMENT OF RUBBER

[75] Inventors: Isao Ona, Chiba; Tsutomu Naganawa, Ichihara; Toshio Suzuki, Chiba; Tadashi Okawa, Ichihara, all of Japan

[73] Assignee: Toray Silicone Company Limited, Tokyo, Japan

[21] Appl. No.: 251,616

[22] Filed: Sep. 29, 1988

[30] Foreign Application Priority Data

Oct. 5, 1987 [JP] Japan .................. 62-251362

[51] Int. Cl.$^4$ ............................................. B32B 9/04
[52] U.S. Cl. ................................. 428/447; 528/15; 528/17; 528/18; 528/19; 528/21; 528/34; 528/901; 524/474; 524/490; 524/491; 524/588; 524/731; 524/837; 524/860; 428/423.1; 428/500; 428/501; 428/523
[58] Field of Search .............. 528/15, 17, 18, 19, 528/21, 34, 901; 524/474, 490, 491, 588, 731, 837, 860; 428/447, 423.1, 500, 521, 523

[56] References Cited

U.S. PATENT DOCUMENTS 4,359,340 11/1982 Comper et al. .................. 106/38.22

FOREIGN PATENT DOCUMENTS 57-11394 7/1982 Japan .
60-179211 9/1985 Japan .

Primary Examiner—Melvyn I. Marquis
Attorney, Agent, or Firm—Alexander Weitz

[57] ABSTRACT

A composition for the surface treatment of rubber is disclosed which comprises (A) a diorganopolysiloxane capped with a triorganosiloxy group at one end and a hydroxyl or alkoxy group at the other end; (B) at least one compound selected from organotrialkoxysilanes, organotriacyloxysilanes, organotrioximesilanes or tetraalkyl silicates; and (C) a condensation-reaction catalyst. The composition imparts durable release and lubrication properties to rubber bladders used in the manufacture of tires.

20 Claims, No Drawings

COMPOSITION FOR THE SURFACE TREATMENT OF RUBBER

The present invention relates to a composition for the surface treatment of rubber, and, more precisely, relates to a treatment composition which can impart durable release and lubrication properties to rubber surfaces.

BACKGROUND OF THE INVENTION

With regard to prior rubber-surface treatment agents, Japanese Patent Application Laid Open No. 57-111394 [111,394/82] discloses a lubricating composition for the bladders used in tire manufacturing. This composition comprises polydimethylsiloxane, alkoxysilane, and a zinc catalyst.

In addition, Japanese Patent Application Laid Open No. 60-17911 [179,211/85] also discloses a lubricating composition for tiremaking bladders, in this case comprising a polymer emulsion prepared from alkoxysilane and hydroxyl-terminated diorganopolysiloxane.

However, the dimethylpolysiloxane in the composition described in Japanese Patent Application Laid Open No. 57-111394 is in fact not a dimethylpolysiloxane terminated at one end by the hydroxyl group or an alkoxy group and terminated at the other end with a triorganosiloxy group. As a consequence, it is only weakly reactive with rubber surfaces, which results in a poor adhesion, and it also has poor lubrication properties.

Furthermore, because a catalyst is not used for the composition described in Japanese Patent Application Laid Open No. 60-179211, the crosslink density is so low that a durable lubrication cannot be obtained.

The object of the present invention is to solve the problems listed above by introducing a rubber surface-treatment composition which will generate a durable release activity and durable lubrication by virtue of its reaction with the rubber surface and the formation of crosslinkages during curing.

SUMMARY OF THE INVENTION

The aforesaid object is achieved by means of a composition for treating rubber surfaces which comprises (A) 100 weight parts of a diorganopolysiloxane having the following general formula

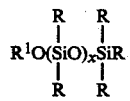

wherein R is a monovalent hydrocarbon group, $R^1$ is a hydrogen atom or an alkyl group having 1 to 6 carbon atoms and x is an integer with a value of 1 to 1,000;

(B) 0.1 to 30 weight parts of at least one compound selected from the group consisting of organotrialkoxysilanes, organotriacyloxysilanes, organotrioximesilanes and tetraalkyl silicates; and (C) 0.1 to 20 weight parts of a condensation-reaction catalyst.

DETAILED DESCRIPTION OF THE INVENTION

Considering the above in greater detail, the component (A) used by the present invention is a diorganopolysiloxane which is chain-stopped at one end by a hydroxyl group or by an alkoxy group and which is chain-stopped at the other end by a triorganosiloxy group. This component reacts with component (B) on the rubber surface to provide durable release and lubrication properties.

The group R in the above formula is a monovalent hydrocarbon group. This group is exemplified by alkyl groups such as methyl, ethyl and propyl; alkenyl groups such as vinyl, allyl and butadienyl; aryl groups such as phenyl, xenyl and naphthyl; cycloalkyl groups such as cyclohexyl; cycloalkenyl groups such as cyclohexenyl; aralkyl groups such as benzyl; alkaryl groups such as tolyl and xylyl; as well as derivatives of the preceding. Alkyl, alkenyl, and aryl groups are preferred, and the groups R may be identical or different.

$R^1$ represents a hydrogen atom or an alkyl group having 1 to 6 carbon atoms. These alkyl groups are exemplified by methyl, ethyl, propyl and isobutyl.

The subscript x is an integer with a value of 1 to 1,000. When x is less than 1, the smoothness and release-ability will in particular be unsatisfactory. On the other hand, the reactivity with component (B) becomes poor at values of x in excess of 1,000. x is preferably in integer falling within the range of 10 to 500.

The diorganopolysiloxane comprising the instant component can be prepared by the reaction at room temperature for approximately 2 to 3 hours of, for example, cycloorganosiloxane and alkyllithium in tetrahydrofuran. After neutralization of the catalyst with (e.g.) acetic acid and removal of the tetrahydrofuran in vacuo, the product is recovered by filtration. Diorganopolysiloxanes with advantageous degrees of polymerization (DP) can be prepared by varying the ratio between the cycloorganosiloxane and alkyllithium.

Component (B), that is, at least one species selected from organotrialkoxysilanes, organotriacyloxysilanes, organotrioximesilanes or tetraalkyl silicates, participates in a condensation reaction with component (A), but also reacts with the rubber surface and particularly with filler present in the rubber composition. Organosilanes within the scope of this component typically have the following general formula $$YSiZ_3$$

wherein Y is a monovalent organic group and Z is an alkoxy group, acyloxy group or oxime group. The monovalent organic group Y is exemplified by such groups as aminopropyl, ethylaminopropyl, n-butylaminoethyl, cyclohexylaminopropyl, phenylaminoethyl, N-aminoethylaminopropyl, dimethylaminopropyl, glycidyloxypropyl, 3,4-epoxycyclohexylethyl, mercaptopropyl, methacryloxypropyl, methyl, ethyl, and vinyl, Examples of the group Z are alkoxy groups such as methoxy, ethoxy, propoxy and methoxyethoxy; acyloxy groups such as acetoxy; and oxime groups.

Component (B) is exemplified by the following compounds:
amino-containing trialkoxysilanes such as:
 beta-aminoethyltrimethoxysilane,
 beta-aminoethyltriethoxysilane,
 beta-aminoethyltriisopropoxysilane,
 gamma-aminopropyltrimethoxysilane,
 gamma-aminopropyltriethoxysilane,
 gamma-aminopropyltri(n-propoxy)silane,
 gamma-aminopropyltri(n-butoxy)silane,
 delta-aminobutyltrimethoxysilane,
 epsilon-aminohexyltriethoxysilane, 4-aminocyclohexyltriethoxysilane,
4-aminophenyltrimethoxysilane,
N-aminoethyl-gamma-aminopropyltrimethoxysilane, and
N-aminoethyl-gamma-aminopropyltriethoxysilane;
epoxy-containing trialkoxysilanes such as:
  beta-glycidoxyethyltrimethoxysilane,
  beta-glycidoxyethyltriethoxysilane,
  gamma-glycidoxypropyltriethoxysilane,
  beta-(3,4-epoxycyclohexyl)ethyltrimethoxysilane,
  beta-(3,4-epoxycyclohexyl)ethyltriethoxysilane, and
  gamma-(3,4-epoxycyclohexyl)propyltriethoxysilane;
mercapto group-containing trialkoxysilanes such as:
  gamma-mercaptopropyltrimethoxysilane, and
  gamma-mercaptopropyltriethoxysilane;
methacryloxy group-containing trialkoxysilanes such as
  gamma-methacryloxypropyltrimethoxysilane, and
  gamma-methacryloxypropyltriethoxysilane;
alkyltrialkoxysilanes such as:
  methyltrimethoxysilane, and
  ethyltriethoxysilane;
alkenyltrialkoxysilanes such as:
  vinyltrimethoxysilane, and
  allyltrimethoxysilane;
the preceding alkoxysilanes in which the alkoxy groups have been replaced by acetoxy groups or oxime groups; and tetraethyl silicate.

Preferred from the standpoint of reactivity are the alkyl silicates and organosilanes in which the monovalent organic group Y is a reactive, functionalized monovalent organic group such as aminopropyl, ethylaminopropyl, n-butylaminoethyl, cyclohexylaminopropyl, phenylaminoethyl, N-aminoethylaminopropyl, dimethylaminopropyl, glycidyloxypropyl, 3,4-epoxycyclohexylethyl, mercaptopropyl and methacryloxypropyl.

Component (B) is used at 0.1 to 30 weight parts and preferably at 1 to 10 weight parts for each 100 parts of component (A).

Component (C), a condensation-reaction catalyst, functions to bring about a reaction between components (A) and (B). Typical condensation catalysts in this regard are amine catalysts lacking organosilicon and organometallic catalysts. The organometallic catalysts are illustrated by the metal salts of organic acids, for example, dibutyltin diacetate, dibutyltin dilaurate, dioctyltin dilaurate, dibutyltin dioctoate, zinc naphthenate, cobalt naphthenate, zinc octylate, tin octylate, cobalt octylate, dioctyltin di(isomercaptoacetate), zirconium naphthenate, zirconium octylate, and tetrabutyl orthotitanate. Diethanolamine and triethanolamine are typical examples of amine catalysts lacking organosilicon.

Component (C) is used at from 0.1 to 20 weight parts, preferably at from 0.5 to 15 weight parts, for each 100 parts of component (A).

The lubricant composition of the present invention is applied on the rubber surface after mixing the above components (A) and (B), or (A), (B), and (C), to homogeneity. For use, the composition of the present invention may be diluted with organic solvent or may be converted into an emulsion.

Organic solvents in this regard are exemplified by toluene, xylene, hexane, heptane, rubber volatile oil, perchloroethylene and 1,1,1-trichloroethane. The organic solvent may comprise only the single solvent from among the preceding or may consist of a combination of two or more of these solvents.

Furthermore, emulsions may be prepared by some typical method of emulsification using water and one or more cationic surfactants such as aliphatic amine salts, quaternary ammonium salts and alkylpyridinium salts, or nonionic surfactants such as polyoxyalkylene alkyl ethers, polyoxyalkylene alkylphenol ethers, polyoxyalkylene alkyl esters, sorbitan alkyl esters and polyoxyalkylene sorbitan alkyl esters.

With regard to this emulsification, each of component (A), component (B) and component (C) can be emulsified separately, the emulsion of component (C) can be mixed with the emulsion of the mixture of component (A) and component (B), or the emulsion of component (B) can be mixed with emulsion of the mixture of component (A) and component (C). Furthermore, when a water-soluble or water-dispersible silane such as an amino group-containing alkoxysilane is used as component (B), component (B) can be added directly to the emulsion of component (A) and/or component (C). Protective colloids can be added as emulsion stabilizers, for example, polyvinyl alcohol or methylcellulose.

As long as the object of the present invention is not adversely impacted, the following may be added as desired to the composition of the present invention: silica aerogel, fumed silica, and such silicas whose surfaces have been treated with silanes such as alkoxysilanes or halosilances, or with silazanes or with low DP organopolysiloxanes; inorganic fillers such as zinc oxide, zinc carbonate and calcium carbonate; pigments; diorganopolysiloxanes chain-stopped at both terminals by the trialkylsiloxy group, for example, dimethylpolysiloxane chain-stopped at both terminals by the trimethylsiloxy group; small quantities of diorganopolysiloxane chain-stopped at both terminals with the hydroxyl group, inter alia.

The surface-treatment composition according to the present invention is uniformly sprayed or coated on the rubber surface and then dried. Upon standing for at least 10 hours at room temperature or heating at 130 to 200 degrees Centigrade, the organopolysiloxane in the present composition reacts with the rubber surface to form a strong film. As a consequence, a durable releaseability and lubricity are imparted to the rubber surface.

Furthermore, the rubber surface can also be preliminarily treated with a silicone primer.

The rubber substrates for the treatment composition of the present invention comprise both natural and synthetic rubbers. The synthetic rubbers are exemplified by SBR, NBR, chloroprene, butyl rubbers, EPDM, urethane rubbers, chlorosulfonated polyethylenes, room temperature-curable silicone rubbers, thermosetting silicone rubbers, and addition reaction-curing silicone rubbers.

EXAMPLES

The invention will be explained below with reference to illustrative examples. In the examples, parts=weight parts, %=weight %, and the viscosity was measured at 25 degrees Centigrade.

(Reference) Example 1

300 Parts hexamethylcyclotrisoloxane, 300 parts tetrahydrofuran, and butyllithium ($4.32 \times 10^{-4}$ mol per gram hexamethylcyclotrisiloxane) were placed in a four-neck flask equipped with a stirrer, thermometer, and reflux condenser. A reaction was conducted for 1.5 hours with stirring (conversion =80%). Small pieces of dry ice (10 parts) were added to the reaction mixture in order to neutralize the catalyst. After purification by filtration, the volatiles were stripped at 170 degrees Centigrade/10 mmHg to afford a dimethylpolysiloxane (A) with the following formula.

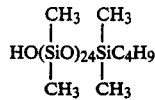

Example 1

10 Parts dimethylpolysiloxane (A) with the formula

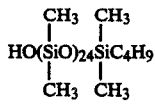

as obtained in (Reference) Example 1, 0.8 parts N-aminoethyl-gamma-aminopropyltrimethoxysilane, 0.1 part dibutyltin diacetate as catalyst, and 89.4 parts toluene were mixed to homogeneity to prepare a composition of the present invention (treatment solution a).

The surface of a butyl rubber sheet (3 mm thick, 5 cm wide, 15 cm long) suitable for use as a tiremaking bladder was first cleaned with toluene, then sprayed, using a simple spray gun, with this treatment solution to a thickness of approximately 50 millimicrons, and finally dried (20 hours). Heating at 150 degrees Centigrade/5 minutes then gave a strong release film. A strip of masking tape (5 cm wide, 12 cm long, from Sekisui Kagaku Kabushiki Kaisha, Japan) was the adhered on this treated sheet, followed by loading with 80 kg/cm2 for 30 minutes at 25 degrees Centigrade using a press molder. After removal from the press molder, the peel resistance was measured at a rate of 30 cm/minute using a Tensilon (from Toyo Baldwin Kabushiki Kaisha, Japan) tensile tester.

In addition, this same test was repeated by placing masking tape on the same site on the rubber sheet, and the variation in the peel resistance values was monitored. After a total of 20 repetitions, the rubber sheet's surface was evaluated for smoothness by touch using the following scale.

++ excellent smoothness as indicated by a "slippery" surface

+ slightly inferior smoothness as indicated by a slightly "rough" surface x poor smoothness as indicated by a "rough" surface In addition, the durability of the silicone film's adhesion was evaluated on the following scale.

++ the silicone release/lubrication film remained unchanged

+ part of the silicone release/lubrication film had disappeared x the silicone release/lubrication film had almost completely disappeared In a comparison example, a treatment solution b was prepared exactly as for treatment solution a with the exception that a dimethylpolysiloxane chain-stopped at both terminals with the hydroxyl group (45 centistokes at 25 degrees Centigrade) and with the following formula

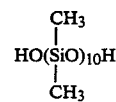

was used in the composition of treatment solution a in place of dimethylpolysiloxane (A).

In another comparison example, a treatment solution c was prepared exactly as for treatment solution a with the exception that a dimethylpolysiloxane chain-stopped at both terminals with trimethylsiloxy groups (55 centistokes at 25 degrees Centigrade) and with the following formula

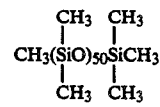

was used in the composition of treatment solution a in place of dimethylpolysiloxane (A).

These treatment solutions were tested in the same manner as treatment solution a, and these results are reported in Table 1.

As Table 1 makes clear, the rubber sheet treated with treatment solution a (invention) had a very low peel resistance, even after 20 repetitions of the test, and this silicone film also had a very smooth surface after the 20th peel resistance measurement. Thus, the durability of this silicone film was excellent.

TABLE 1

| Peel Resistance (g/m) No. of Repetitions | Invention Treatment Solution a | Comparison Examples | |
|---|---|---|---|
| | | Treatment Solution b | Treatment Solution c |
| 1 | 7.8 | 8.0 | 6.8 |
| 3 | 7.0 | 59.8 | 63.5 |
| 5 | 7.2 | 119.3 | 225.5 |
| 10 | 13.2 | 165.4 | 635.3 |
| 15 | 12.2 | 208.3 | not peeled |
| 20 | 13.0 | 355.8 | not peeled |
| smoothness | ++ | + | x |
| silicone film durability | ++ | + | x |

Example 2

The surface of a butyl rubber tiremaking bladder was cleaned with toluene and acetone, and was then preliminarily treated with a primer (Primer P) comprising 180 parts acetone, 10 parts methyltrimethoxysilane, 5 parts N-aminoethyl-gamma-aminopropyltrimethoxysilane, and 5 parts gamma-mercaptopropyltrimethoxysilane. After standing for 3 hours at room temperature, 100 g of treatment solution a (approximately 5 g organopolysiloxane fraction) as prepared in Example 1 was sprayed on the bladder's surface using a simple spray gun. After evaporation of the solvent, the surface was heated in a hot-air circulator at 150 degrees Centigrade for 30 minutes. The composition of the invention formed a strong film on the bladder's surface, and this surface also presented a superior smoothness.

This bladder was installed in a BAG-O-MATIC vulcanizer and was then repeatedly used to produce passenger tires by the vulcanization of green tires: it was possible to produce 18 tires, thus confirming the generation of a durable smoothness and releaseability.

Treatment solutions b and c were subjected to the same testing: only 6 tires could be produced using treatment solution b, and only 2 tires could be obtained with treatment solution c.

Example 3

30 Parts of the dimethylpolysiloxane (A) as described in Example 1 and, as surfactants, 3.3 parts polyoxyalkylene alkyl ether (Emulgen 108 from Kao Company Limited, Japan) and 0.7 parts polyoxyethylene alkylphenol ether (Emulgen 911 from Kao Company Limited) were mixed to homogeneity. After the addition of 4.5 parts water, the mixture was emulsified in a colloidal mill. The further addition of 61.5 parts water afforded an emulsion denoted as treatment solution d.

After dilution of this emulsion by the addition of 50 parts water to 50 parts treatment solution d, 2.5 parts N-aminoethyl-gamma-aminopropyltrimethoxysilane was added and dispersed and dissolved to homogeneity to afford a treatment solution e. 0.5 Parts of a catalyst emulsion prepared from 10 parts Na polyoxyethylene nonylphenol ether sulfate, 30 parts dibutyltin dioleate, and 60 parts water was added to the total of treatment solution e to produce a treatment solution according to the invention.

This treatment solution was sprayed on the surface of a butyl rubber bladder as described in Example 2, followed by heating (approximately 8.5 g organopolysiloxane fraction per bladder). 13 Tires could be produced, confirming a durable releaseability and smoothness.

(Reference) Example 2

100 Parts hexamethylcyclotrisiloxane, 100 parts tetrahydrofuran, and butyllithium (5.71×10-5 mol butyllithium per g hexamethylcyclotrisiloxane) were charged to a four-neck flask equipped with a stirrer, thermometer, and reflux condenser, and a reaction was carried out for 3 hours with stirring (conversion - 85%). The catalyst was neutralized by the addition of small pieces of dry ice (5 parts). After purification by filtration, the volatiles were stripped at 170 degrees Centigrade/5 mmHg, thus to afford a dimethylpolysiloxane with the following formula.

Example 4

100 Parts dimethylpolysiloxane as prepared in (Reference) Example 2 with the following formula

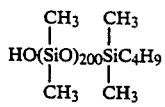

3.5 pars of a vinyltrioximesilane with the following formula

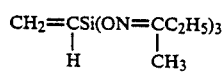

3 parts N-aminoethyl-gamma-aminopropyltrimethoxysilane, and 0.5 parts dioctyltin dilaurate as catalyst were dissolved to homogeneity in 900 parts n-hexane to prepare a treatment solution of the invention.

The surface of a butyl rubber tiremaking bladder was preliminarily treated with the Primer P described in Example 2. After drying for 5 hours at room temperature, the previously prepared treatment solution according to the invention was sprayed on this surface using a simple spray gun at 7 g organopolysiloxane fraction per bladder. After solvent removal at room temperature, the surface was treated in a hot-air circulator at 170 degrees Centigrade for 15 minutes. The surface of the obtained bladder was very smooth and slippery, thus evidencing an excellent lubricity.

The treated bladder was installed in a BAG-O-MATIC vulcanizer and then repeatedly used to produce passenger tires by the vulcanization of green tires: 15 tires could be produced.

For comparison, a bladder surface was treated with a treatment solution prepared by omitting only the vinyltrioximesilane from the instant treatment solution according to the invention. Only 4 passenger tires could be produced.

(Reference) Example 3

100 Parts hexamethylcyclotrisiloxane, 100 parts tetrahydrofuran, and butyllithium (1.12×10-4 mol per gram hexamethylcyclotrisiloxane) were charged to a four-neck flask equipped with a stirrer, thermometer, and reflux condenser, and a reaction was carried out for 2 hours with stirring (conversion - 82%). The catalyst was then neutralized by the addition of small pieces of dry ice (5 parts). After purification by filtration, the volatiles were stripped at 150 degrees Centigrade/5 mmHg to afford a dimethylpolysiloxane with the following formula.

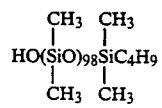

Example 5

100 Parts dimethylpolysiloxane with the formula

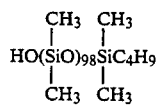

as prepared in (Reference) Example 3, 2.5 parts tetraethyl silicate, 3.0 parts N-aminoethyl-gamma-aminopropyltrimethoxysilane, and 3 parts dibutyltin dilaurate were mixed to homogeneity to prepare a treatment solution according to the present invention.

The surface of a styrene/butadiene synthetic rubber sheet (5 mm thick, 200 mm wide, 200 mm long) was cleaned and was then brushed with the Primer P described in Example 2. After drying at room temperature for 6 hours, the sheet was brushed with the above treatment solution. This was allowed to stand at room temperature for 20 hours. A releaseable sheet was then obtained by heating for 10 minutes at 50 degrees Centigrade.

A stainless steel cavity mold (100 mm×100 mm×3 mm interior) was set on this releaseable sheet, and an unvulcanizes styrene-butadiene rubber sheet (approximately 3.1 mm thick×100 cm×100 cm) was cut and fitted into the mold. Molding was carried out at 30 kg/cm2/150 degrees Centigrade on a compression molder.

The release agent-coated surface was easily peeled from the mold, thus confirming the generation of an excellent releaseability. This procedure was repeated 25 times: the releaseability was excellent throughout the repetitions, and no partial adhesion was detected.

Example 6

20 Parts dimethylpolysiloxane with the formula

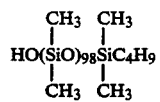

as prepared in (Reference) Example 3, 0.4 parts vinyltriacetoxysilane, 0.2 parts dibutyltin dilaurate as catalyst, and 79.3 parts toluene were mixed to homogeneity to prepare a treatment solution composition of the present invention.

The surface of a butyl rubber tiremaking bladder was then treated with the Primer P described in Example 2 and dried at room temperature for 2 hours. The previously prepared treatment solution composition according to the present invention was sprayed on using a simple spray gun at 9 g organopolysiloxane fraction per bladder. After removal of the solvent at room temperature and drying, the bladder was heated for 15 minutes at 170 degrees Centigrade in a hot-air circulator.

The surface of this bladder was very smooth and slippery, confirming an excellent lubricity.

The treated bladder was installed in a BAG-O-MATIC vulcanizer and repeatedly used to produce passenger tires by the vulcanization of green tires: 16 tires could be produced.

For comparison, the surface of a rubber bladder was treated with a treatment solution prepared as in the present example with the omission of only the vinyltriacetoxysilane. Only 5 passenger tires could be produced.

We claim:
1. A composition comprising:
(A) 100 parts by weight of a diorganopolysiloxane having the general formula

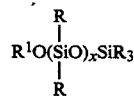

wherein R is a monovalent hydrocarbon group, $R^1$ is selected from the group consisting of hydrogen and an alkyl group having 1 to 6 carbon atoms and x is an integer having a value of 1 to 1,000;
(B) from 0.1 to 30 parts by weight of at least one compound selected from the group consisting of organotrialkoxysilanes, organotriacyloxysilanes, organotrioximesilanes and tetraalkyl silicates; and
(C) from 0.1 to 20 parts by weight of a condensation-reaction catalyst selected from the group consisting of amine catalyst lacking organosilicon catalysts and organometallic catalysts.

2. The composition according to claim 1, wherein said component (B) is selected from the group consisting of alkyl silicates and organosilanes having the general formula $$YSiZ_3$$

in which Y is a monovalent organic group and Z is selected from the group consisting of alkoxy, acyloxy and oxime groups.

3. The composition according to claim 2, wherein R of said diorganopolysiloxane (A) is a methyl radical.

4. The composition according to claim 3, wherein Y of said compound (B) is selected from the group consisting of aminopropyl, ethylaminopropyl, n-butylaminoethyl, cyclohexylaminopropyl, phenylaminoethyl, N-aminoethyl-gamma-aminopropyl, dimethylaminopropyl, glycidyloxypropyl, 3,4-epoxycyclohexylethyl, mercaptopropyl and methacryloxypropyl groups.

5. The composition according to claim 4, wherein $R^1$ is hydrogen and x is 10 to 500.

6. The composition according to claim 5, wherein from 1 to 10 parts by weight of said compound (B) and from 0.5 to 15 parts by weight of said catalyst (C) are employed for each 100 parts by weight of said diorganopolysiloxane (A).

7. The composition according to claim 6, wherein said compound (B) is N-aminoethyl-gamma-aminopropyltrimethoxysilane.

8. The composition according to claim 7, wherein said catalyst (C) is a tin salt of an organic acid.

9. The composition according to claim 1, further comprising an organic solvent.

10. The composition according to claim 2, further comprising an organic solvent.

11. The composition according to claim 4, further comprising an organic solvent.

12. The composition according to claim 5, further comprising an organic solvent.

13. An aqueous emulsion of the composition of claim 1.

14. An aqueous emulsion of the composition of claim 2.

15. An aqueous emulsion of the composition of claim 4.

16. An aqueous emulsion of the composition of claim 5.

17. A rubber substrate treated with the composition of claim 1.

18. A rubber substrate treated with the composition of claim 2.

19. A rubber substrate treated with the composition of claim 4.

20. A rubber substrate treated with the composition of claim 5.

* * * * *